Aug. 2, 1960          R. WIEDMANN          2,947,046
METHOD OF MAKING PLASTIC LAMINATED CORE BOXES AND PATTERNS
Filed July 1, 1957                          3 Sheets-Sheet 1

INVENTOR.
Richard Wiedmann.
BY
Wood, Herron & Evans.
ATTORNEYS.

INVENTOR.
Richard Wiedmann.
BY Wood, Herron & Evans.
ATTORNEYS.

INVENTOR.
Richard Wiedmann.
BY
Wood, Herron & Evans.
ATTORNEYS.

United States Patent Office 2,947,046
Patented Aug. 2, 1960

2,947,046

METHOD OF MAKING PLASTIC LAMINATED CORE BOXES AND PATTERNS

Richard Wiedmann, Cincinnati, Ohio, assignor to The Lunkenheimer Company, Cincinnati, Ohio, a corporation of Ohio Filed July 1, 1957, Ser. No. 669,342

3 Claims. (Cl. 22—195)

This invention relates to the art of pattern making and is more particularly directed to a method of producing laminated core boxes and patterns for use in sand molding operations.

The principal object of the present invention is to provide a core box or pattern which is very durable and yet can be manufactured at a fraction of the cost of a conventional metal core box or pattern.

More particularly, the present invention is predicated upon the concept of providing a core box or mold comprising a metal base member having a surface lamination of an epoxy resin. In a core box, the metal base member constitutes a frame having one or more cavities of the same general configuration as the core but slightly larger than the core; each of the cavities has a lining or surface laminate of an epoxy resin configured and dimensioned to exactly the shape desired. In the case of a pattern, the metal base member forms an insert, or reinforcing member, with a surface layer of epoxy resin being coated over the outer surface of the base member.

The methods of preparing core boxes and patterns are in general similar to one another and each of the methods is disclosed in detail below. However, in order to provide a basic understanding of the invention at this point, only the process of forming laminated core boxes will be referred to.

A core box constructed in accordance with the present invention comprises a metal frame, such as an aluminum casting. The casting is provided with one or more cavities of the same general shape and slightly larger than the cores to be produced. Each of these cavities is lined with an epoxy resin, the exposed surface of which conforms exactly to the shape of the desired core. I have empirically determined that the thickness of this epoxy resin laminate should be substantially constant within a range of from 3/32 and 3/8 inch thick.

In producing such a core box, the first step is to prepare a master core which is preferably formed of wood but may be formed of any other suitable material if desired. The surface of the master core is then covered with a substantially uniform layer of putty or a smaller material. The putty is applied to the same thickness as the desired final thickness of the epoxy laminate. In the next step of the process, the putty covered master core is used to make a female mold of gypsum cement, plaster of paris or the like. This mold pattern is in turn placed in a conventional sand mold. After the gypsum mold pattern is removed from the sand mold the frame member is cast in the usual manner. This metal casting is machined square, but no machining is required within the cavities.

Next, the putty is removed from the master core and the master core is clamped to the cast metal frame member with the master core disposed within the enlarged cavity formed in the base member. However, the core is spaced from the walls of the cavity by the thickness of the removed putty layer. The space between the master core and base member is then filled with an epoxy resin while the base member and master core are vibrated to eliminate bubbles. After pouring, the resin is cured at room temperature from 4–12 hours and the master core removed after which the surface of the cavity is lightly polished. The second frame member is fabricated in the same manner and when completed, the two frame members are doweled to ready them for use.

One of the principal advantages of a core box constructed in this manner is that it is substantially more economical to produce than a machined metal core box having a comparable service life. The present method eliminates any necessity for machining the core cavity, since the precise dimensions of the cavity in the rough casting, or frame member, are not critical and the final dimensions of the cavity walls are cast in the epoxy resin laminate directly from the master core.

A further advantage of the present core box is that it can be utilized for many hundreds of core molding operations without appreciable wear or without change in dimensions. The thin epoxy resin lamination does not shrink and remains stable after it has been cured. Furthermore, the resin lining resists abrasion and has a very long service life.

It will be readily appreciated by those skilled in the art, that the advantages described above are also provided by a pattern constructed in accordance with this invention.

These and other objects and advantages of the present invention will be more readily apparent from a consideration of the following detailed description of the drawings illustrating two preferred embodiments of the present invention.

In the drawings:

Figure 2 is a longitudinal cross sectional view showing two master half-cores mounted upon a board, the cores being coated with a layer of putty or the like.

The present invention contemplates the production of laminated metal and plastic core boxes and patterns. Figures 2–7 illustrate the manner in which laminated core boxes are produced in accordance with this invention; and Figures 8–13 show the manner in which laminated patterns are constructed by means of this invention. It is to be understood that the actual core boxes and patterns shown are only exemplary and that minor variations may be made in the present method in order to produce shapes of a more complex figuration.

Figure 1:
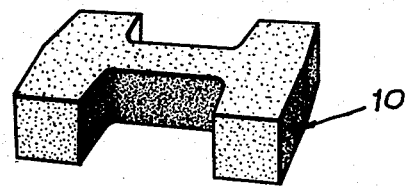
Figure 1 is a perspective view of a sand core formed in a typical core box of the present invention.
Figure 2:
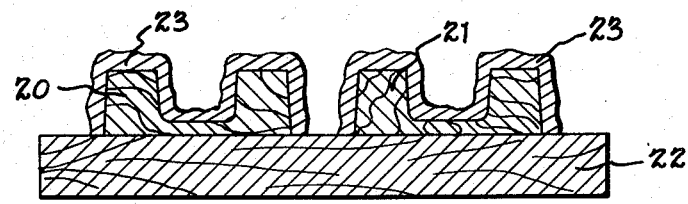
Figure 3:
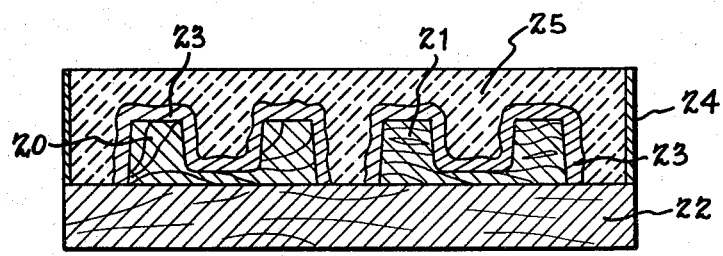
Figure 3 is a longitudinal cross sectional view showing the manner in which the putty covered master cores of Figure 2 are employed to make a gypsum mold.
Figure 7:
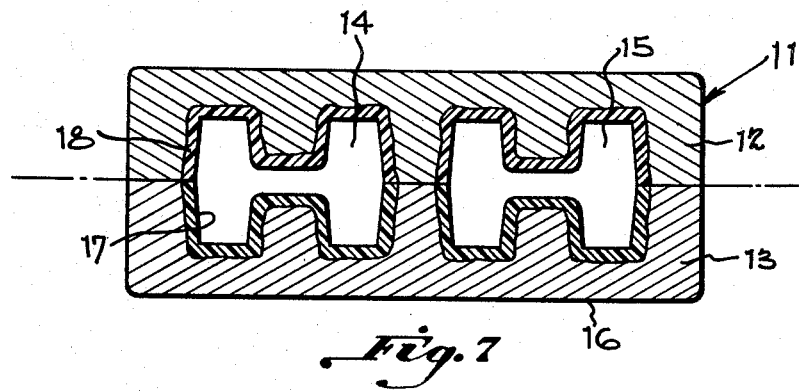
Figure 7 is a longitudinal cross sectional view through a completed multiple gang core box constructed in accordance with the present invention.

Figure 1 shows a typical sand core adapted to be molded in the core box of Figure 7. Sand core 10 which is utilized in conventional foundry procedure for defining a cavity in the interior of a casting, can be formed by packing the core box with sand or by blowing sand into the box. Core box 11 for producing these cores is best shown in Figure 7 and comprises an upper section 12 and lower section 13 defining therebetween cavities 14 and 15 having the desired shape of core 10. It is to be understood that the present method can be used to produce core boxes having any number of cavities from a single cavity to a dozen or more.

More particularly, as shown in Figure 7 each of the core box sections comprises a frame, or base member 16 formed of a suitable metal such as aluminum. Base member 16 is provided with two cavities having the same general outline configuration as cavities 14 and 15 but being of somewhat larger size. Each of these enlarged cavities is lined with a suitable plastic material such as an epoxy resin. The interior surface 17 of the resin laminate 18 is smooth and conforms exactly to the size and shape of core 10. The epoxy resin layer is of substantially uniform thickness, although the juncture of the plastic and metal frame is along a somewhat irregular surface. This irregularity has been greatly magnified in the drawings to emphasize that this surface of the metal frame need not be machined. I have empirically determined that the optimum thickness of the epoxy resin layer is ¼ of an inch and that in order to avoid cracking in the plastic and to maintain accurate dimensions the thickness of the layer should be kept between 3/32" and 3/8".

In order to produce the laminated core box shown in Figure 7, two master half-cores 20 and 21 each corresponding to one half of core 10 are mounted upon a board 22 in any suitable manner such as by means of screws or the like. Board 22 may extend completely under the master cores, or the board may be in the form of a narrow strip. In either case, the primary function of the board is to establish the spacing between cores 20 and 21. If desired the board can be omitted and the cores handled individually.

Each master core 20 and 21 is covered with a layer 23 of spacing material. One suitable spacing material is a putty compound; although it is contemplated that other material such as wax can be employed if desired. The outer surface of the spacing material is not finished; however, the material is shaped so that its thickness is substantially uniform over the entire exposed surface of the master core. Since as will be apparent later, the thickness of this material determines the ultimate thickness of the plastic laminate within the inner cavity, the putty is preferably applied ¼ of an inch thick.

Figure 4:
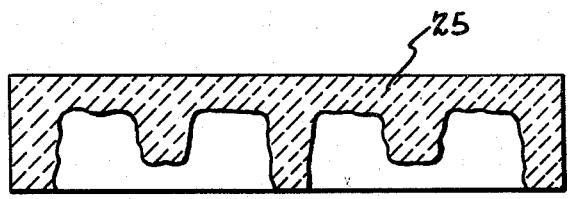
Figure 4 is a longitudinal cross sectional view through the gypsum mold shown in Figure 3.

The next step is to place a retaining box 24 over board 22. This box surrounds the master cores 20 and 21 and is spaced an appreciable distance from the outer walls of these master cores. Cores 20 and 21 are coated with a parting compound; and the space within the retaining box is then filled with a suitable material such as gypsum plaster to form female gypsum mold 25. The finished gypsum mold 25 is best shown in Figure 4.

Figure 5:
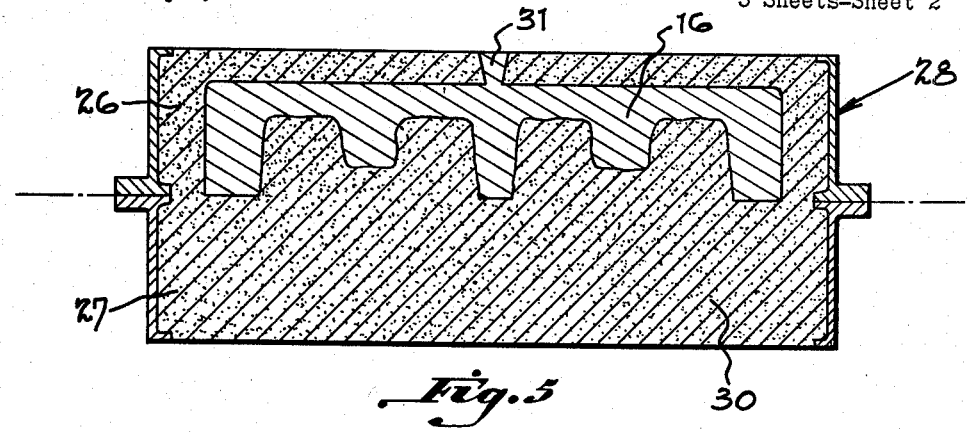
Figure 5 is a longitudinal cross sectional view through a sand mold showing the manner in which a metal casting is produced having the same shape as the gypsum mold of Figure 4.

This mold 25 is then used in connection with conventional sand casting techniques to form metal base member 16. More particularly, as shown in Figure 5, gypsum mold 25 is used to form the cope and drag sections 26 and 27 of sand mold 28. After the molding sand 30 within these sections has been shaped, the mold sections are parted and the gypsum core removed from the mold sections. Thereafter, the sections are reassembled and metal base member 16 is poured through a suitable sprue opening 31. The molds are again parted and base member 16 is removed. Any necessary machining operations are then performed upon the outer surface of the frame to bring it to the desired size and to square up its parting face. The enlarged cavities formed in frame member 16 are cleaned preferably by sand blasting, but are otherwise left in their "as cast" condition. This process is repeated to form lower frame section 16.

Figure 6:
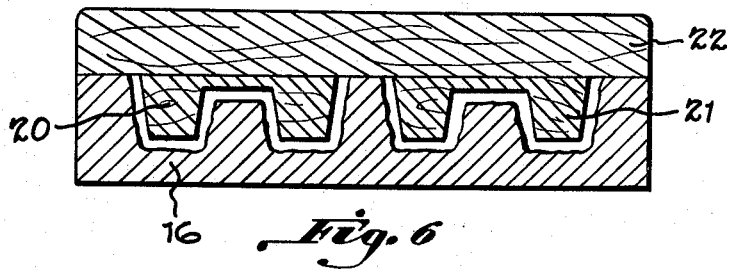
Figure 6 is a longitudinal cross sectional view showing the master cores with the putty removed in assembled relationship with the metal casting.

In the next step the putty layer 23 is removed from the master cores 20 and 21 and a suitable parting compound is coated over the exposed surfaces of these cores which remain mounted upon board 22. The metal frame member 16 and master cores 20 and 21 are then assembled as shown in Figure 6. The master cores are nested within the enlarged core openings formed in the metal base member, and are supported in place by the ends of board 22 which spans the cavities. The adjacent surfaces of the cores and the enlarged cavities are spaced from one another a uniform distance equal to the thickness of the putty layer originally applied to the master cores.

An epoxy resin is then introduced into the cavities by pouring it into the space between the master core and frame. If board 22 should cover this space, suitable openings are formed in the board to permit resin to be poured into the cavity. This epoxy resin fills the space between the base member and master cores, the master core being effective to shape the inner surface of the plastic to the exact configuration desired. The epoxy resin is poured at a temperature of from 75°–80° Fahrenheit, the base member being at room temperature. While the resin is being poured, the base member, master core and resin are vibrated by means of a suitable mechanical vibrator so that no air bubbles remain in the plastic.

After pouring, the epoxy is cured at room temperature for a period of from 4–12 hours. In the final step the master core is removed and the exposed plastic surfaces of the cavities are lightly polished. Lower section 13 is formed in the same manner. After the upper and lower core box sections are completed in this manner, they are clamped together and fitted with suitable dowel pins or the like.

Figure 8:
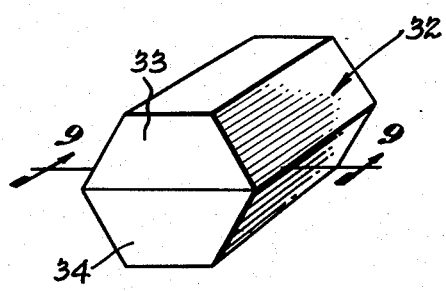
Figure 8 is a perspective view of a pattern constructed in accordance with the principles of the present invention.
Figure 9:
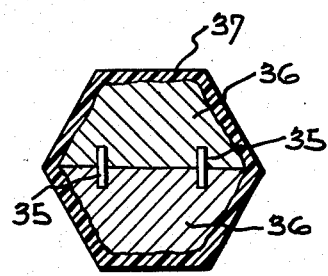
Figure 9 is a transverse cross sectional view of the pattern taken along line 9—9 of Figure 8.

The manner of making a plastic pattern in accordance with the present method is best shown in Figures 8–13. By way of illustration a typical pattern 32 is shown in Figures 8 and 9. This pattern is of hexagonal cross section and is a sectional pattern including an upper half 33, a lower half 34 held in registry by a plurality of dowel pins 35 or the like. Each of the upper and lower sections comprises a base member or insert 36 and a surface laminate 37 of an epoxy resin. The resin is of substantially uniform thickness on the sides and ends of the pattern. It is preferably ¼ inch thick; but depending upon the pattern may vary from 3/32" to 3/8".

Figure 10:
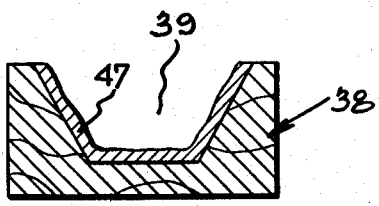
Figure 10 is a transverse cross sectional view through one section of a mold for the master pattern, the mold cavity being coated with a layer of spacing material such as putty.
Figure 11:
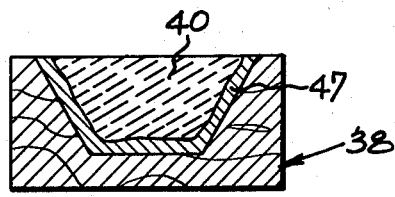
Figure 11 is a transverse cross sectional view showing the manner in which a gypsum mold is made from the coated master pattern mold.

In producing such a pattern, the first step is to produce a master mold 38. This mold may be formed of wood or may be cast in plaster from a master pattern. It will be appreciated that Figure 10 illustrates a mold for forming either the upper or lower section of the pattern. If a one piece pattern were to be produced, a second identical mold section could be employed in cooperation with the mold section shown to define the entire contour of the pattern.

The master mold 38 has a cavity 39 conforming to the exact shape and size of the master pattern. In accordance with the present method the walls of this cavity are covered with a layer 47 of putty, wax or the like to a substantially uniform thickness of approximately ¼ inch; thus the remaining cavity is appreciably smaller than pattern section 34 but is of generally the same shape.

Figure 12:
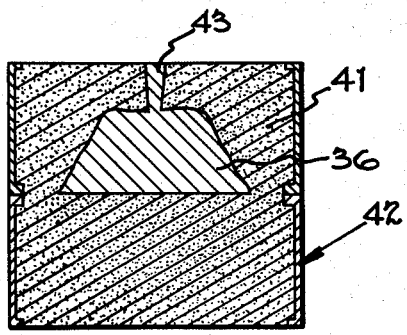
Figure 12 is a transverse cross sectional view through a sand mold showing the manner in which a metal casting is formed having the same configuration as the gypsum mold.

In the next step, a gypsum or plaster mold of reduced cross sectional area is formed by coating the putty with grease or another suitable parting compound and filling the mold cavity with a quantity of gypsum 40. When hardened this gypsum mold is removed and is then used as shown in Figures 12 to form metal insert 36. More particularly, the gypsum mold is used in a conventional sand casting process to form a cavity in the cope section 41 of mold 42. After the gypsum member is removed and the cope and drag sections of mold 42 are reassembled, aluminum or other suitable metal is poured into the molding cavity through sprue 43. After the metal insert has cooled, it is removed from the mold and is sand blasted or otherwise cleaned. A second identical insert is formed for use with upper pattern section 33.

Figure 13:
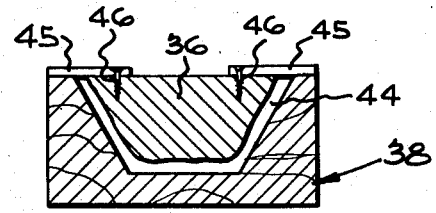
Figure 13 is a transverse cross sectional view showing the metal base of Figure 12 mounted in assembled relationship with the mold for the master pattern.

In the final step of the process, one metal base member 36 is mounted within the cavity 39 of the master mold leaving a space 44 between the mold walls and base member, the space being equal to the space occupied by the original putty layer. As shown in Figure 13, insert 36 is held in place by means of strips 45 formed of wood, brass or the like, the strips being joined by means of screws 46 to the insert and resting upon the walls of the master mold 38. Space 44 is then filled with an epoxy resin, the epoxy resin being poured at approximately 75°–80° as explained above, with the base member being maintained at room temperature. While the epoxy resin is being poured, the base member, master mold and resin are vibrated to prevent any air bubbles from remaining in the plastic laminate. After the resin is cured, by standing at room temperature from 4–12 hours, the pattern section is removed and the outer surface is lightly polished. An upper section 33 is laminated in the same manner and the sections 33 and 34 are doweled to complete the pattern for use.

Having described my invention, I claim:

1. A method of producing a core box for use in forming a sand core of predetermined configuration, said method comprising the steps of preparing a master core having a surface configuration corresponding to at least one-half of the sand core to be formed, coating said master core with a substantial uniform thickness of removable spacing material, said thickness being not less than 3/32 inch and not more than 3/8 inch, preparing a mold from said coated master core, using said mold to produce a metal base member which is identical to said mold, removing said spacing material from said master core, coating said master core with a parting compound, mounting said metal base member relative to said master core such that said base member and said master core are spaced apart a distance equal to the thickness of said removable spacing material, filling said space with liquid epoxy-resin while vibrating said base member and said master core as an unit to free said resin of air bubbles, maintaining said base member and said master core in said spaced relationship until said resin cures, and after the resin is cured, removing said master core to leave the resin as a permanent laminate adhering to the surface of said base member as a part thereof.

2. A method of producing a pattern comprising the steps of providing a master mold having a cavity the surface configuration of which corresponds to the shape of the pattern to be produced, coating the surface of the cavity of said master mold with a substantially uniform thickness of removable spacing material, said thickness being not less than 3/32 inch and not more than 3/8 inch, preparing a temporary mold from the coated cavity of said master mold, using said temporary mold to produce a metal base member which is identical to said temporary mold, removing said spacing material from the cavity of said master mold, coating the surface of the cavity of said master mold with a parting compound, mounting said metal base member relative to the surface of the cavity of said master mold such that base member and the surface of the cavity of said master mold are spaced apart a distance equal to the thickness of said removable spacing material, filling said space with a liquid epoxy-resin while vibrating said base member and said master mold as an unit to free said resin of air bubbles, maintaining said base member and said master mold in spaced relationship until said resin cures,, and after the resin is cured, removing said metal base member from said master mold to leave the resin as a permanent laminate adhering to the surface of said base member as a part thereof.

3. A method of producing a member for use in forming a sand element of predetermined configuration, said method comprising the steps of preparing a first member having a negative surface configuration relative to the sand element to be formed, coating said first member with a substantially uniform thickness of a removable spacing material, said thickness being not less than 3/32 inch and not more than 3/8 inch, preparing a mold from said coated first member, using said mold to produce a metal base member, removing said spacing material from the first member, coating said first member with a parting compound, mounting said base member relative to said first member such that said base member and said first member are spaced apart a distance equal to the thickness of said spacing material, filling said space with a liquid epoxy-resin while vibrating said base member and said first member to free said resin of air bubbles, maintaining said base member and said first member in said spaced relationship while said resin cures, and after the resin is cured removing said first member to leave the cured resin as a permanent laminate adhering to the surface of said base member as a part thereof.

References Cited in the file of this patent

UNITED STATES PATENTS

| | | |
|---|---|---|
| 779,979 | Walter | Jan. 10, 1905 |
| 2,487,965 | Dresser | Nov. 15, 1949 |
| 2,735,829 | Wiles | Feb. 21, 1956 |
| 2,792,381 | Shokal | May 14, 1957 |
| 2,795,680 | Peck | June 11, 1957 |
| 2,801,989 | Farnham | Aug. 6, 1957 |
| 2,846,742 | Wagner | Aug. 12, 1958 |

FOREIGN PATENTS

| | | |
|---|---|---|
| 766,065 | Great Britain | Jan. 16, 1957 |

OTHER REFERENCES

Steel—article titled "Plastic Speeds Pattern Making," pages 108–109 in the February 11, 1957, issue.